United States Patent [19]

Lapeyre

[11] 4,394,664
[45] Jul. 19, 1983

[54] THERMAL PLOTTER

[75] Inventor: James M. Lapeyre, New Orleans, La.

[73] Assignee: The Laitram Corporation, New Orleans, La.

[21] Appl. No.: 344,021

[22] Filed: Jan. 29, 1982

[51] Int. Cl.³ ............................................ G01D 15/10
[52] U.S. Cl. ................................................. 346/76 R
[58] Field of Search ...................... 346/1.1, 135.1, 136, 346/108, 76

[56] References Cited

U.S. PATENT DOCUMENTS 1,820,088  8/1931  Parker et al. ................. 346/76 R X
2,653,126  9/1953  Greig ............................ 346/76 R X Primary Examiner—Donald A. Griffin
Attorney, Agent, or Firm—Weingarten, Schurgin, Gagnebin & Hayes

[57] ABSTRACT

A thermal plotter is provided which is of extremely simple construction and which can provide a magnified trace on a sheet in response to very small mechanical movement. A pair of spaced electrically conductive bus bars are disposed with their forward edges in contact with an electrical resistance wire which is maintained at a small acute angle to the axis of the bus bars. The resistance wire is supported by a mechanism which is moveable about a pivot axis to cause lateral movement of the portion of the resistance wire which bridges the bus bars. Small pivotal movement of the mechanism is magnified by the angular orientation of the resistance wire and bus bars into relatively larger movement along the length of the bus bars. A heat sensitive sheet is disposed with a surface in engagement with the confronting edges of the bus bar and bridging resistance wire, and is arranged for movement along a path transverse to the axis of the bus bars. An electrical potential is applied to the bus bars to cause current flow through the bridging portion of the resistance wire and the heating thereof. The heated wire is operative to cause formation of a visible image on the confronting sheet in a pattern corresponding to movement of the bridging portion.

10 Claims, 4 Drawing Figures

THERMAL PLOTTER

FIELD OF THE INVENTION

This invention relates to graphic plotters, and more particularly to thermal plotters.

BACKGROUND OF THE INVENTION

Thermal plotting apparatus is known in which heat is selectively applied to a thermally reactive sheet to cause a visible image to appear on the sheet. A heated stylus is arranged for movement on a thermally responsive sheet in response to an applied signal to provide a corresponding trace on the plotting sheet. Alternatively, a stylus array confronts the sheet, and the styli are selectively energized to cause formation of a visible image on the sheet. Such plotters of known construction can be relatively complex and expensive, especially if high resolutions are to be achieved.

SUMMARY OF THE INVENTION

In accordance with this invention a thermal plotter is provided which is of extremely simple construction and which can provide a magnified trace on a sheet in response to very small mechanical movement. A pair of spaced electrically conductive bus bars are disposed with their forward edges in contact with an electrical resistance wire which is maintained at a small acute angle to the axis of the bus bars. The resistance wire is supported by a mechanism which is moveable about a pivot axis to cause lateral movement of the portion of the resistance wire which bridges the bus bars. Small pivotal movement of the mechanism is magnified by the angular orientation of the resistance wire and bus bars into relatively larger movement along the length of the bus bars. A heat sensitive sheet is disposed with a surface in engagement with the confronting edges of the bus bar and bridging resistance wire, and is arranged for movement along a path transverse to the axis of the bus bars. An electrical potential is applied to the bus bars to cause current flow through the bridging portion of the resistance wire and the heating thereof. The heated wire is operative to cause formation of a visible image on the confronting sheet in a pattern corresponding to movement of the bridging portion.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
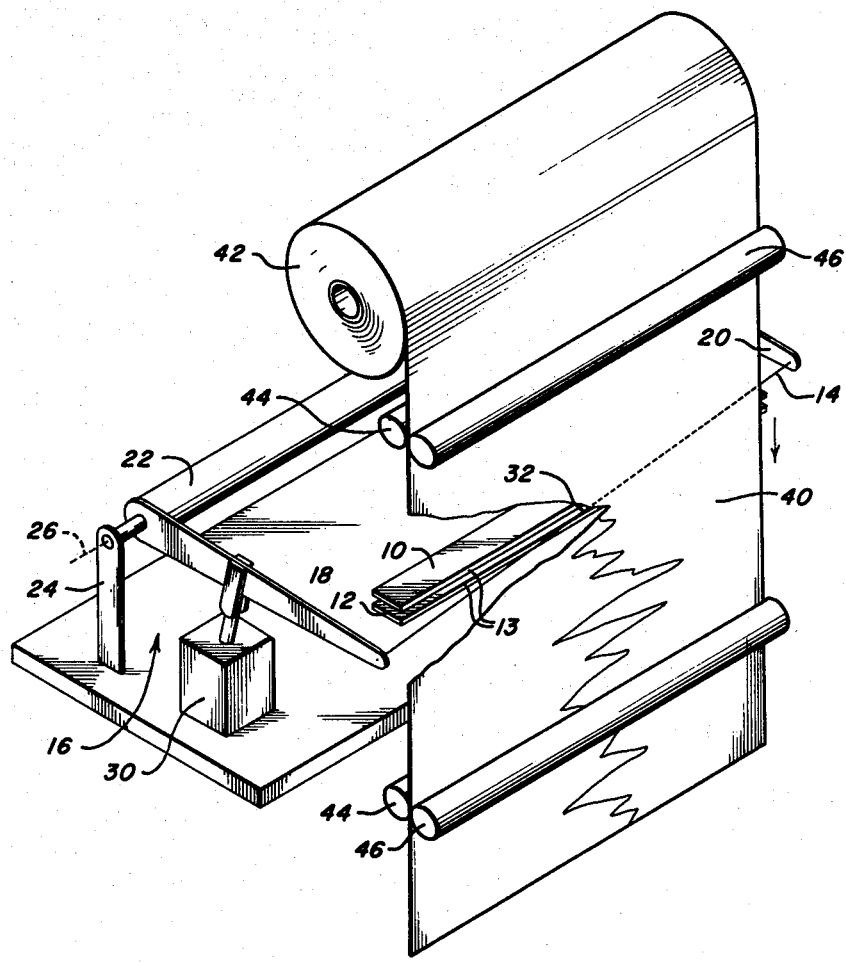
FIG. 1 is a pictorial view of a thermal plotter embodying the invention.

Referring to FIG. 1 of the drawing, there is shown a thermal plotter which includes a pair of parallel spaced electrically conductive bus bars 10 and 12 having respective forward edges 13 across which a resistance wire 14 is tautly maintained. The bus bars are supported by a support structure 16. The resistance wire 14 is supported by pair of arms 18 and 20 which outwardly extend from respective ends of a pivot rod 22 which is attached to support elements 24 and which is rotatable about a pivot axis 26. A transducer 30 is coupled to the support arm 18 which is operative in response to an electrical or mechanical input to impart pivotal movement to the support structure. The resistance wire 14 is disposed at an acute angle to the axis of the bus bars 10 and 12, and has a bridging portion 32 in contact with the forward edges 13 of the bus bars to provide a resistive path between the bus bars.

Figure 2:
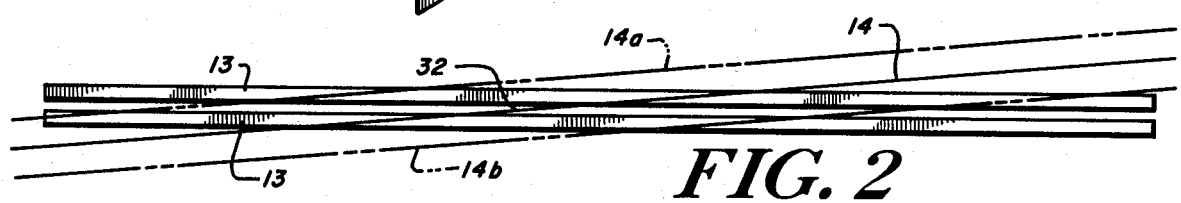
FIG. 2 is a front view illustrating the movement of the resistance wire in relation to the bus bars.
Figure 4:
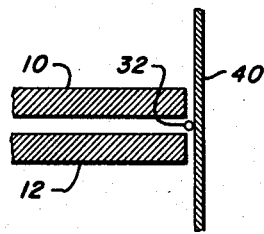
FIG. 4 is a sectional side elevation view of the bus bars, resistance wire, and confronting sheet.
Figure 3:
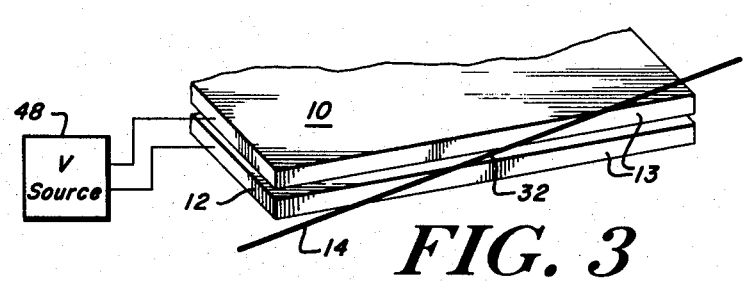
FIG. 3 is a cutaway pictorial view illustrating the relative orientation of the resistance wire and bus bars.

Movement of the resistance wire 14 caused by movement of its support structure causes linear movement of the bridging portion 32 along the length of the bus bars, as illustrated in FIG. 2 in which the dotted lines 14a and 14b depict different positions of the wire 14. By reason of the skewed orientation of the resistance wire in relation to the bus bars, as is also illustrated in FIGS. 2 and 3, small mechanical movement of the support structure of the resistance wire caused by the transducer 30 is magnified into relatively larger movement of the bridging portion 32 along the length of the bus bars. Thus, small pivotal movement of the support structure is converted into relatively large linear movement across the width of the bus bars to provide a high resolution image on the writing surface of the associated thermally responsive sheet.

The thermally responsive sheet 40 is contained in a supply roll 42 and is guided by confronting pairs of rollers 44 and 46 along a path which engages the forward edges 13 of the bus bars and the bridging portion 32 of the resistance wire. The sheet moves along a travel path shown by the arrow in FIG. 1 which is orthogonal to the axis of the bus bars, and the sheet can be caused to move in its path by any appropriate driving mechanism. An electrical energy source 48 (FIG. 3) is connected to the bus bars 10 and 12 to provide a voltage thereacross and to cause a current flow through the bridging portion 32 of the resistance wire 14 which interconnects the bus bars. The bridging portion of the resistance wire is heated to a temperature sufficient to activate the heat-sensitive sheet 40 to provide a visible image. Such image can be formed by volatilizing a heat-responsive coating on a surface of the sheet to render visible the underlying black or other visually distinct layer, or by chemical change in the coating. The spacing of the bus bars and the length of the bridging portion of the resistance wire determines the minimum "spot" size of the image formed on the writing surface. The angle between the resistance wire and the axis of the bus bars will determine the magnification of the apparent linear motion of the bridging portion in relation to the pivotal movement of the support structure of the resistance wire. The smaller the angle between the resistance wire and the bus bar axis, the greater the magnification will be.

The transducer 30 can be of many different types responsive to various input conditions. As an example, the transducer can be a solenoid or linear actuator responsive to an electrical signal to provide corresponding movement of the support structure for the resistance wire. Alternatively, the transducer can be responsive to a mechanical force, as in the case of a pressure transducer, to provide movement of the support structure. In operation, an input condition, such as an electrical signal, will cause movement in the transducer 30 of the resistance wire support structure, which will cause linear movement of the bridging portion 32 of the resistance wire 14 along the length of the bus bars. The scanning of the heated bridging portion causes a corresponding trace to be provided on the confronting sheet 40, and movement of the sheet transversely across the bus bars will cause a two-dimensional trace to be generated. In some instances, a single axis trace may be all that is required, in which case the sheet need not be moved relative to the bus bars. In most instances, however, the sheet will be moved along its transverse path to provide a two-dimensional plot representative of a condition being measured. The electrical power applied to the bus bars can be pulsed to produce a dashed trace on the sheet. The pulsed power can also be employed to regulate the resulting temperature of the resistance wire.

The invention is not to be limited by what has been particularly shown and described except as indicated in the appended claims.

What is claimed is:

1. A thermal plotter comprising:
   a pair of electrically conductive elements spaced from each other and disposed along a first axis;
   an electrical resistance wire disposed at an acute angle to said first axis of said elements and having a bridging portion in contact with the front edges of the elements;
   means for supporting the resistance wire at an acute angle to said first axis and operative to move the wire along a second axis transverse to the first axis, and to cause movement of the bridging portion of the wire along the front edges of said elements;
   means coupled to the support means for causing movement of the wire along the second axis in response to an input;
   means for providing a voltage across said elements;
   a thermally responsive sheet disposed in contact with the front edges of the elements;
   the bridging portion of the wire being heated by electrical current flowing therethrough to a temperature sufficient to produce a visible image on the sheet;
   the movement of the bridging portion of the wire along said elements being magnified in relation to movement of the wire along the second axis.

2. The thermal plotter of claim 1 wherein said means coupled to the support means is a transducer operative in response to an electrical signal to cause movement of the wire along the second axis.

3. The thermal plotter of claim 1 wherein the means coupled to the support means is a transducer operative in response to a mechanical force to cause movement of the wire along the second axis.

4. The thermal plotter of claim 1 wherein said electrically conductive elements are in parallel spaced relationship along the first axis, the spacing between the elements and the length of the bridging portion, defining the spot size of the image which can be formed on the sheet.

5. The thermal plotter of claim 1 wherein the thermally responsive sheet is disposed for movement along an axis transverse to the first axis.

6. The thermal plotter of claim 1 wherein said means for supporting the resistance wire includes a mechanism for movement of the wire about a pivot axis.

7. The thermal plotter of claim 6 wherein the mechanism includes a pivot axis parallel to the first axis and spaced therefrom.

8. A thermal plotter comprising:
   a pair of electrically conductive elements spaced from each other and disposed along a first axis;
   a support assembly including a pivot rod supported for rotation about a pivot axis, and arms outwardly extending from the pivot rod and rotatable therewith;
   an electrical resistance wire extending between and supported by the outward ends of the support arms;
   said resistance wire being disposed at an acute angle to said first axis of said elements, and having a bridging portion in contact with the front edges of the elements;
   means coupled to the support assembly for causing rotation thereof about the pivot axis in response to an input condition;
   the movement of the resistance wire causing linear movement of the bridging portion of the wire along the front edges of said elements;
   means for providing a voltage across said elements to cause current flow through the bridging portion of the resistance wire and heating of the bridging portion to a temperature sufficient to cause activation of the thermally responsive sheet; and
   a thermally responsive sheet disposed in contact with the front edges of the elements and bridging portion of the resistance wire.

9. The thermal plotter of claim 8 wherein the voltage providing means is operative to provide pulsed power to said elements.

10. A thermal plotter comprising:
    a pair of electrically conductive elements spaced from each other and disposed along a first axis;
    an electrical resistance wire disposed at an acute angle to said first axis of said elements and having a bridging portion in contact with the front edges of the elements;
    means for supporting the resistance wire and electrically conductive elements with the resistance wire at an acute angle to said first axis and operative to provide relative movement between the wire and elements along a second axis transverse to the first axis, thereby to cause movement of the bridging portion of the wire along the front edges of said elements;
    means coupled to the support means for causing movement of the wire along the second axis in response to an input;
    means for providing a voltage across said elements;
    a thermally responsive sheet disposed in contact with the front edges of the elements;
    the bridging portion of the wire being heated by electrical current flowing therethrough to a temperature sufficient to produce a visible image on the sheet;
    the movement of the bridging portion of the wire along said elements being magnified in relation to movement of the wire along the second axis.

* * * * *